(12) United States Patent
Le et al.

(10) Patent No.: US 6,910,120 B2
(45) Date of Patent: Jun. 21, 2005

(54) SPECULATIVE COUNTING OF PERFORMANCE EVENTS WITH REWIND COUNTER

(75) Inventors: Hung Qui Le, Austin, TX (US); Alexander Erik Mericas, Austin, TX (US); Robert Dominick Mirabella, Round Rock, TX (US); Toshihiko Kurihara, Kanagawa-ken (JP); Michitaka Okuno, Nagano (JP); Masahiro Tokoro, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 10/210,357

(22) Filed: Jul. 31, 2002

(65) Prior Publication Data

US 2004/0024996 A1 Feb. 5, 2004

(51) Int. Cl.[7] ................................................ G06F 11/34
(52) U.S. Cl. ........................ 712/216; 712/239; 714/47
(58) Field of Search ................................ 712/216, 239; 714/47

(56) References Cited

U.S. PATENT DOCUMENTS

| | | | | |
|---|---|---|---|---|
| 5,666,507 A | * | 9/1997 | Flora | 712/218 |
| 5,729,726 A | * | 3/1998 | Levine et al. | 712/233 |
| 5,987,598 A | * | 11/1999 | Levine et al. | 712/227 |
| 6,550,002 B1 | * | 4/2003 | Davidson et al. | 712/216 |

* cited by examiner

*Primary Examiner*—Kenneth S. Kim
(74) *Attorney, Agent, or Firm*—Mark E. McBurney; Dillon & Yudell LLP

(57) ABSTRACT

A circuit and method for maintaining a correct value in performance monitor counter within a speculative computer microprocessor is disclosed. In response to determining the begin of speculative execution within the microprocessor, the value of the performance monitor counter is stored in a rewind register. The performance monitor counter is incremented in response to predetermined events. If the microprocessor determines the speculative execution was incorrect, the value of the rewind register is loaded into the counter, restoring correct value for the counter.

8 Claims, 5 Drawing Sheets

SPECULATIVE COUNTING OF PERFORMANCE EVENTS WITH REWIND COUNTER

BACKGROUND OF THE INVENTION

1. Technical Field

This invention relates to performance monitoring within a speculative microprocessor, more particularly, to maintaining a correct value in a performance monitor counter, and still more particularly to using a rewind register to maintain a correct value in a performance monitor counter within a speculative microprocessor.

2. Description of the Related Art

Many modern microprocessors include a Performance Monitor Unit (PMU). The PMU contains one ore more counters (PMCs) that accumulate the occurrence of internal events that impact or are related to the performance of a microprocessor. For example, a PMU may monitor processor cycles, instructions completed, or delay cycles executing a load from memory. These statistics are useful in optimizing the architecture of a microprocessor and the instructions executed by a microprocessor.

Advances in computer architecture have complicated monitoring events in microprocessors. Specifically, modern processors use speculative execution to improve performance. When a non-speculative processor executes a conditional branch instruction it must first have the results of the condition available before the direction of the branch may be determined. Speculative processors predict, or speculate, on the direction of the branch. If, after the operands are available and the condition may be evaluated, the processor determines if the prediction was correct. If the processor predicted correctly then execution continues. Otherwise, the processor flushes the mispredicted instructions and beings fetching instructions along the correct path.

Similarly, counters within the PMU will contain incorrect values and will need to be adjusted in the event of a misprediction. However, there is no solution in the prior art for correctly resetting PMCs in the event of a branch misprediction. Consequently, the values stored in the PMCs may be incorrect.

Therefore, there is a need for a new and improved method and system for adjusting a counter in a performance monitor unit within a speculative microprocessor in the event of a branch misprediction.

SUMMARY OF THE INVENTION

As will be seen, the foregoing invention satisfies the foregoing needs and accomplishes additional objectives. Briefly described, the present invention provides an improved method and system for maintaining correct values in a performance monitor counter within a speculative processor.

According to one aspect of the present invention, a method and system for maintaining correct values in a performance monitor counter within a speculative processor is provided. In response to determining the begin of speculative execution within the microprocessor, the value of the performance monitor counter is stored in a rewind register. The performance monitor counter is incremented in response to predetermined events. If the microprocessor determines the speculative execution was incorrect, the value of the rewind register is loaded into the counter, restoring correct value for the counter.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
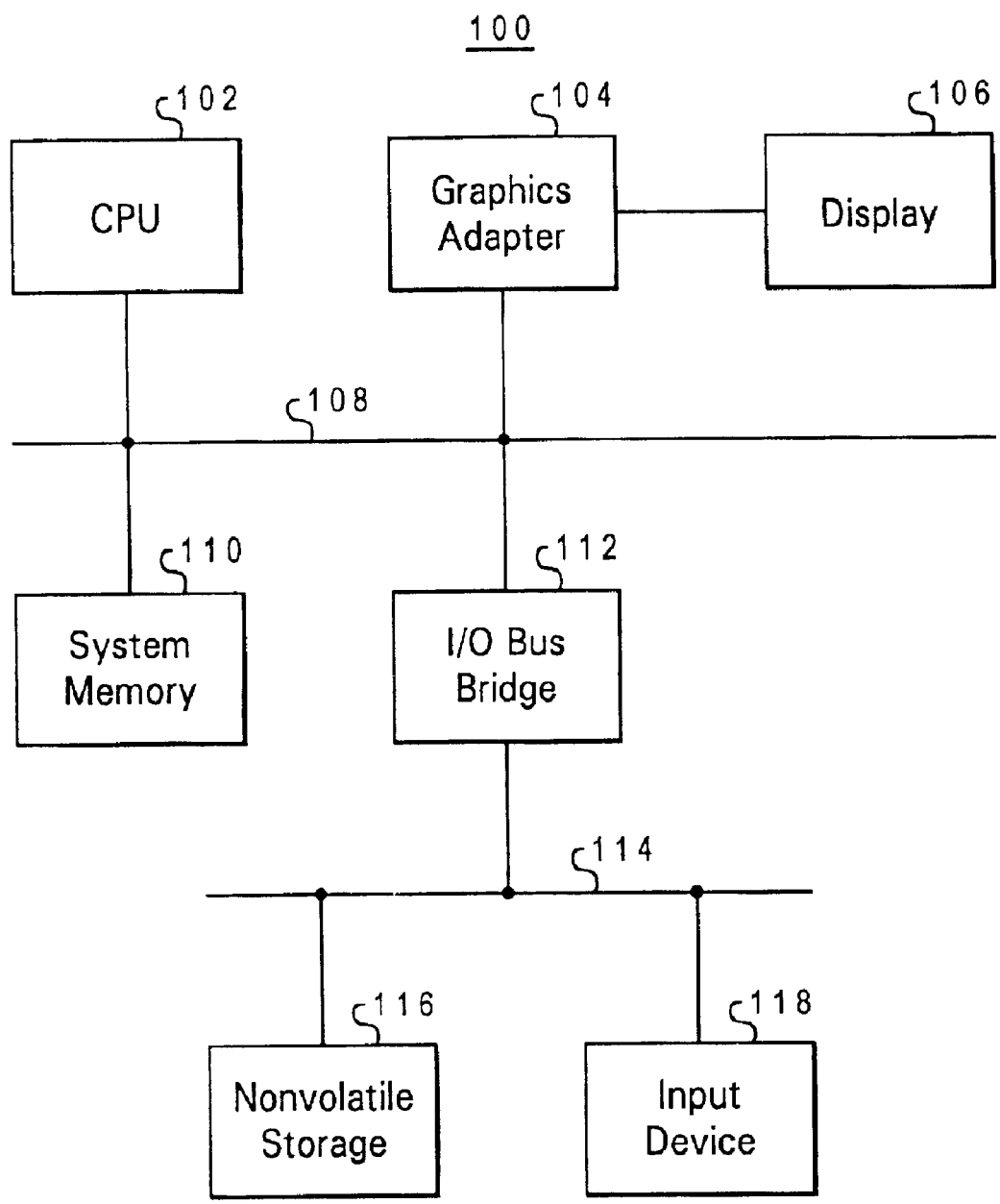
FIG. 1 is a block diagram of an exemplary computer system used in the present invention.

Referring now to the drawing figures, in which like numerals indicate like elements or steps throughout the several views, the preferred embodiment of the present invention will be described. In general, the present invention provides for correctly maintaining the value of a performance monitor counter within a speculative computer microprocessor.

With reference now to FIG. 1, there is depicted a block diagram of a data processing system in which a preferred embodiment of the present invention may be implemented. Data processing system 100 may be, for example, one of the models of personal computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

The CPU 102 described in FIG. 1 is preferably a microprocessor such as the POWER4™ chip manufactured by International Business Machines, Inc. of Armonk, N.Y.

Figure 2:
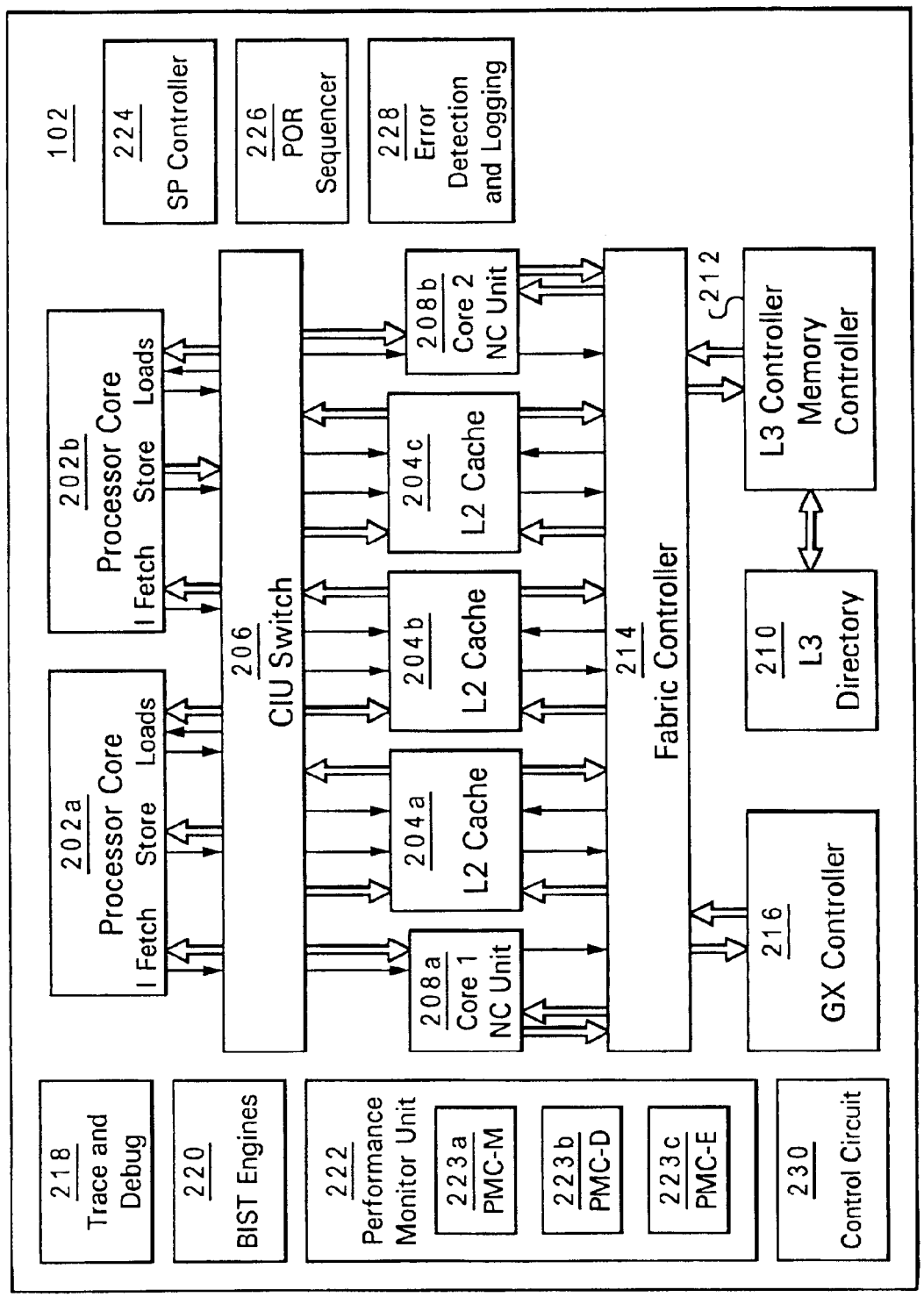
FIG. 2 depicts an exemplary speculative processor used with the present invention.

With reference now to FIG. 2, such an exemplary microprocessor is depicted as CPU 102. In the preferred embodiment, at least two processor cores 202a and 202b are included in CPU 102. Processor cores 202 share a unified second-level cache system depicted as L2 caches 204a–204c, through a core interface unit (CIU) 206. CIU 206 is a crossbar switch between the L2 caches 204a–204c, each implemented as a separate, autonomous cache controller, and the two CPU's 202. Each L2 cache 204 can operate concurrently and feed multiple bytes of data per cycle. CIU 206 connects each of the three L2 caches 204 to either an L1 data cache (shown as D-cache 312 in FIG. 3) or an L1 instruction cache (shown as I-cache 320 in FIG. 3) in either of the two CPU's 102. Additionally, CIU 206 accepts stores from CPU 102 across multiple-byte-wide buses and sequences them to the L2 caches 204. Each CPU 102 has associated with it a noncacheable (NC) unit 208, responsible for handling instruction-serializing functions and performing any noncacheable operations in the storage hierarchy. Logically, NC unit 208 is part of L2 cache 204.

An L3 directory 210 for a third-level cache, L3 (not shown), and an associated L3 controller 212 are also part of CPU 102. The actual L3 may be onboard CPU 102 or on a separate chip. A separate functional unit, referred to as a fabric controller 214, is responsible for controlling dataflow between the L2 cache, including L2 cache 204 and NC unit 208, and L3 controller 212. Fabric controller 214 also controls input/output (I/O) dataflow to other CPUs 102 and other I/O devices (not shown). For example, a GX controller 216 can control a flow of information into and out of CPU 102, either through a connection to another CPU 102 or to an I/O device.

As depicted, PMU 222 includes performance monitor counters (PMC) 223a–c. PMCs 223a–c maybe allocated to count various events related to CPU 102. For example, PMCs 223a–c may be utilized in determining cycles per instruction (CPI), load delay, execution delay, and data dependency delay.

Also included within CPU 102 are functions logically called pervasive functions. These include a trace and debug facility 218 used for first-failure data capture, a built-in self-test (BIST) engine 220, a performance-monitoring unit (PMU) 222, a service processor (SP) controller 224 used to interface with a service processor (not shown) to control the overall data processing system 100 shown in FIG. 1, a power-on reset (POR) sequencer 226 for sequencing logic, an error detection and logging circuitry 228, and control circuit 230 used to maintain correct values in PMCs 223a–c as will be described in more detail in conjunction with FIG. 3.

Figure 3:
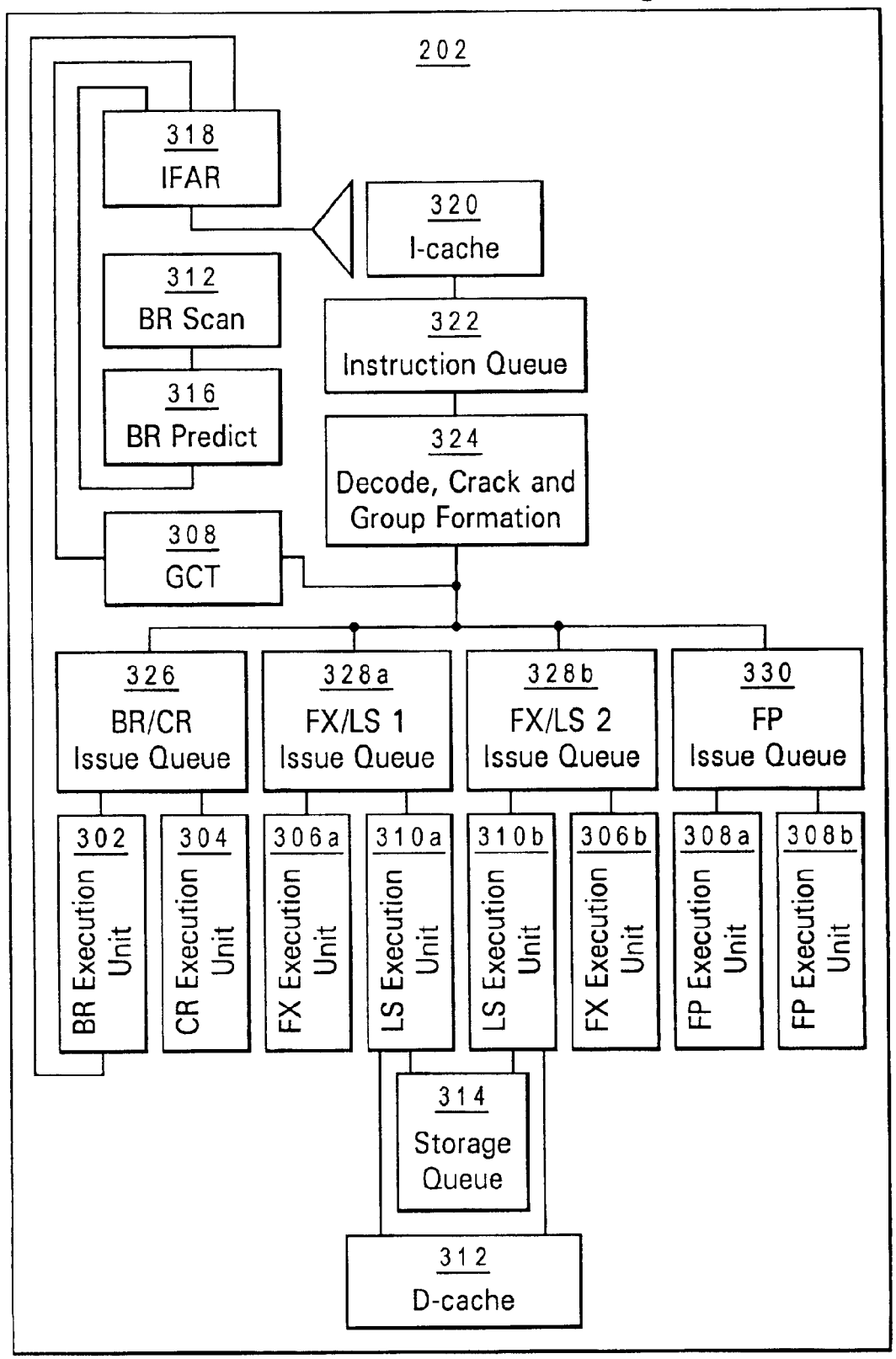
FIG. 3 illustrates an exemplary processor core used with the present invention.

With reference now to FIG. 3, there is depicted a high-level block diagram of processor core 202 depicted in FIG. 2. The two processor cores 202 shown in FIG. 2 are on a single chip and are identical, providing a two-way Symmetric Multiprocessing (SMP) model to software. Under the SMP model, either idle processor core 202 can be assigned any task, and additional CPUs 102 can be added to improve performance and handle increased loads.

The internal microarchitecture of processor core 202 is preferably a speculative superscalar out-of-order execution design. In the exemplary configuration depicted in FIG. 3, multiple instructions can be issued each cycle, with one instruction being executed each cycle in each of a branch (BR) execution unit 302, a condition register (CR) execution unit 304 for executing CR modifying instructions, fixed point (FX) execution units 306a and 306b for executing fixed-point instructions, load-store execution units (LSU) 310a and 310b for executing load and store instructions, and floating-point (FP) execution units 308a and 308b for executing floating-point instructions. LSU's 310, each capable of performing address-generation arithmetic, work with data cache (D-cache) 312 and storage queue 314 to provide data to FP execution units 308.

A branch-prediction scan logic (BR scan) 312 scans fetched instructions located in Instruction-cache (I-cache) 320, looking for multiple branches each cycle. Depending upon the branch type found, a branch-prediction mechanism denoted as BR predict 316 is engaged to help predict the branch direction or the target address of the branch or both. That is, for conditional branches, the branch direction is predicted, and for unconditional branches, the target address is predicted. Branch instructions flow through an Instruction-fetch address register (IFAR) 318, and I-cache 320, an instruction queue 322, a decode, crack and group (DCG) unit 324 and a branch/condition register (BR/CR) issue queue 326 until the branch instruction ultimately reaches and is executed in BR execution unit 302, where actual outcomes of the branches are determined. At that point, if the predictions were found to be correct, the branch instructions are simply completed like all other instructions. If a prediction is found to be incorrect, the instruction-fetch logic, including BR scan 312 and BR predict 316, causes the mispredicted instructions to be discarded and begins refetching instructions along the corrected path.

Instructions are fetched from I-cache 320 on the basis of the contents of IFAR 318. IFAR 318 is normally loaded with an address determined by the branch-prediction logic described above. For cases in which the branch-prediction logic is in error, the branch-execution unit will cause IFAR 318 to be loaded with the corrected address of the instruction stream to be fetched. Additionally, there are other factors that can cause a redirection of the instruction stream, some based on internal events, others on interrupts from external events. In any case, once IFAR 318 is loaded, then I-cache 320 is accessed and retrieves multiple instructions per cycle. The I-cache 320 is accessed using an I-cache directory (IDIR) (not shown), which is indexed by the effective address of the instruction to provide required real addresses. On an I-cache 320 cache miss, instructions are returned from the L2 cache 204 illustrated in FIG. 2.

Figure 4:
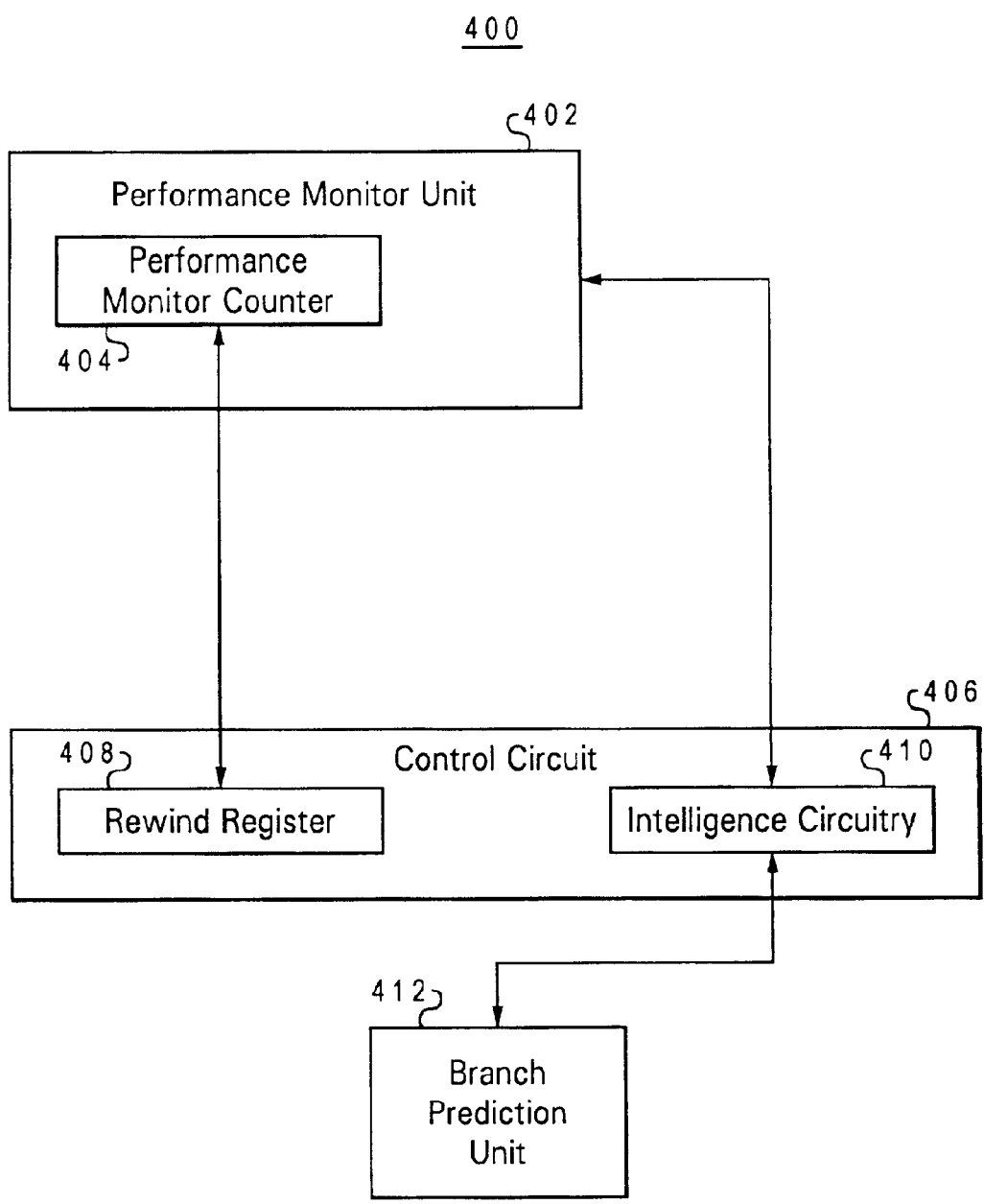
FIG. 4 is a schematic diagram illustrating a possible control circuit of the present invention.

With reference now to FIG. 4, there is depicted a simplified block diagram 400 of an embodiment of control circuit 406 (analogous to control circuit 230 illustrated in FIG. 2) coupled to related microprocessor components according to the principles disclosed by the present invention. The "lines" between the components depicted are not limited to a single wire, but could be multiple wires. Control circuit 406 includes a rewind register 408 and an intelligence circuitry 410. Also shown in the illustrated embodiment are a performance monitor unit (PMU) 402, which includes a performance monitor counter (PMC) 404, and a branch prediction unit (BPU) 412 (analogous to a combination of BR scan 312, BR predict 316, BR/CR issue queue 326, and BR execution unit 302) that are coupled to control circuit 406, specifically, to rewind register 408 and intelligence circuitry 410 respectively.

Rewind register 408 preferably matches the size of PMC 404, allowing for a complete and accurate restoration of PMC 404 in the event of a branch misprediction. However, rewind register 408 is not required to be the same size as PMC 404. A person of skill in the art will readily appreciate how rewind register 408 may be coupled to PMC 404 to permit the value contained in rewind register 408 to be transferred to PMC 404, or vice versa.

Generally, intelligence circuitry 410 receives a control signal from BPU 412 that indicates the start of a speculative execution or a branch misprediction. In the event that a speculative execution is initiated, BPU 412 transmits a speculative execution signal (SSE) to intelligence circuitry 410. It should be noted that events accumulated in performance monitor counter 404, following the initiation of the speculative execution, may have to be discarded following a determination that the microprocessor made a branch misprediction. Accordingly, in response to receiving the SSE signal, intelligence circuitry 410 transmits a store signal (STORE) to PMU 402. The present value of performance monitor counter 404 is stored in rewind register 408 in response to performance monitor unit 402 receiving the STORE signal. With the value of PMC 404 stored prior to the start of speculative execution, it may be restored in the event the speculation was incorrect.

If the microprocessor initiates speculative execution and later determines the speculation was incorrect, BPU 412 transmits a branch misprediction signal (BM) to intelligence circuitry 410. Events accumulated in PMC 404 after the start of speculative execution need to be discarded as the events were the result of incorrectly executed instructions. Consequently, in response to receiving the BM signal, intelligence circuitry transmits a reset signal (RESET) to PMU 402. The value stored in rewind register 408, representing the value of PMC 404 prior to the execution of mispredicted code, is loaded into PMC 404 in response to PMU 402 receiving the RESET signal. With the value of the PMC 404 restored to its value prior to the branch misprediction, the value of PMC 404 does not include counts from incorrectly executed instructions.

Those skilled in the art appreciate that while the control circuit, including the rewind register and intelligence circuitry, is indicated as a separate processor unit, it may be implemented as part of the performance monitor unit, branch prediction unit, other processor units, or any combination thereof without departing from the spirit of the invention. Further, the control signals indicated as originating from a branch prediction unit may originate from other units.

Figure 5:
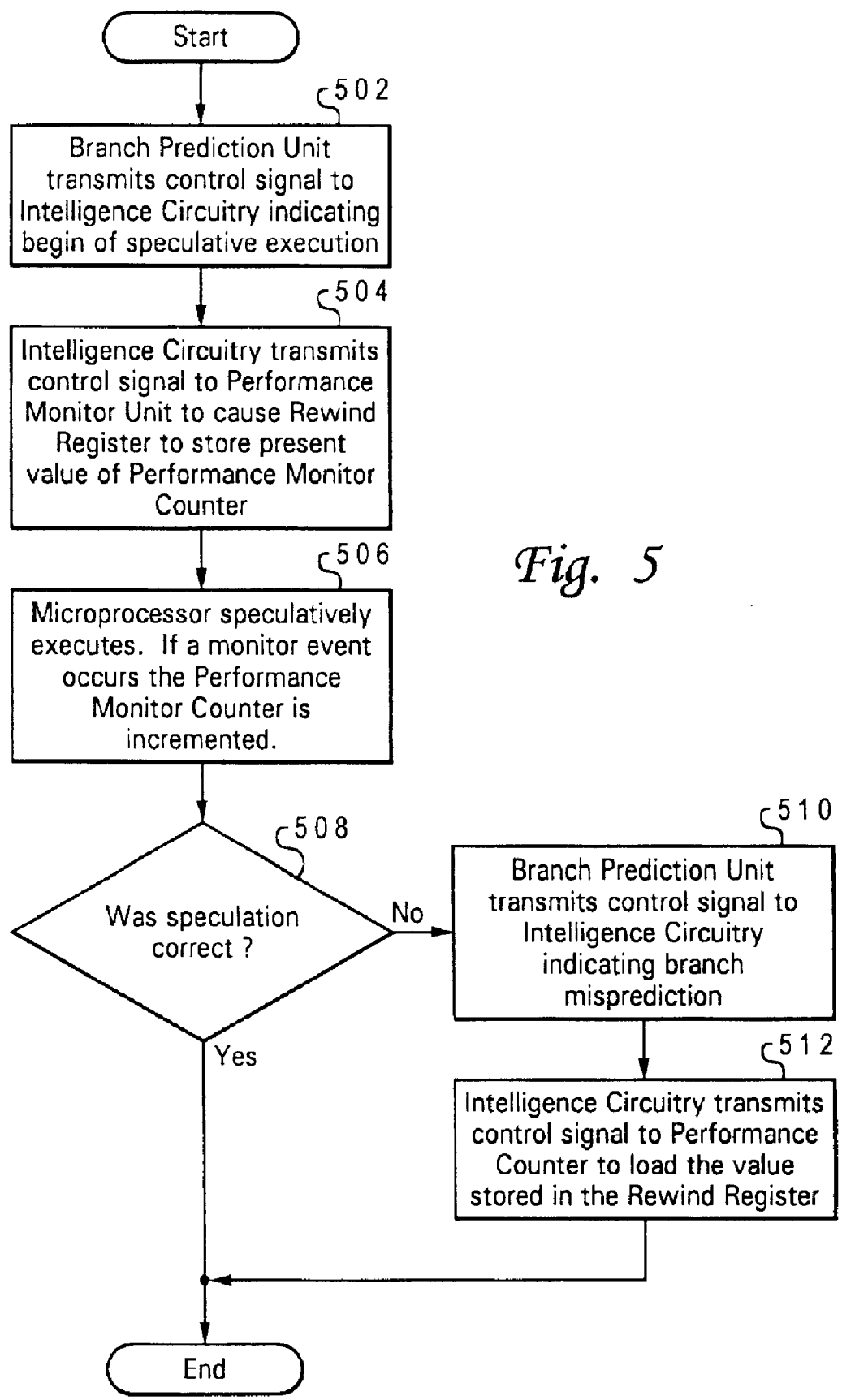
FIG. 5 is a flow chart illustrating one possible set of steps followed by a control circuit to maintain the correct value in a performance monitor counter within a speculative microprocessor.

Referring now to FIG. 5, a flow chart with a set of steps followed to carry out the present invention is illustrated. Before the first step, the microprocessor is assumed to be configured to monitor a particular event and to keep a count of that event in a performance monitor counter. The flow chart depicted in FIG. 5 begins when a processor detects the start of speculative execution. The branch prediction unit transmits a control signal (SSE) to the intelligence circuitry indicating the start of speculative execution as illustrated at step 502. In response to receiving the SSE signal, intelligence circuitry transmits a control signal (STORE) to the performance monitor unit causing the rewind register to store the present value of the performance monitor counter as depicted at step 504. The processor then begins speculative execution.

As indicated with steps 506, the microprocessor beings to execute instructions speculatively until the correctness of the speculation is determined. The microprocessor completes a processor cycle. If an event the performance monitor counter was assigned to accumulate occurs, the performance monitor counter is incremented.

If the processor determines, as depicted at step 508, the speculation was correct, no changes to the performance monitor counter are required. However, if the speculation was incorrect, the branch prediction unit transmits a branch misprediction (BM) signal to the intelligence circuitry as illustrated at step 510. In response to receiving the BM signal, the intelligence circuitry transmits a reset (RESET) signal to the performance monitor unit as depicted at step 512. Further, the value stored in the rewind register is loaded into the performance monitor counter whereby the correct value is maintained in the performance monitor counter despite incorrectly executed instructions.

The present invention has been described in relation to particular embodiments which are intended in all respects to be illustrative rather than restrictive. Alternative embodiments will become apparent to those skilled in the art to which the present invention pertains without departing from its spirit and scope. For example, while the present invention has been described in terms of a processor with two processor cores, the present invention has use in processors of any number or processor cores. Further, the present invention has been described in relation to a branch prediction unit, however, the present invention may find use in any unit that uses speculation. Accordingly, the scope of the present invention is defined by the appended claims rather than the foregoing discussion.

What is claimed is:

1. A control circuit for use with a microprocessor having a speculative processing unit and a performance monitoring unit, said control circuit comprising:

a rewind register having a first rewind register value, said rewind register logically connected to a first performance monitoring counter in said performance monitoring unit, wherein said first performance monitoring counter accumulates a count of delay cycles experienced by said microprocessor during a load from a memory, and wherein said first rewind register value describes an accumulated number of delay cycles that are experienced by said microprocessor before executing a speculative operation; and an intelligence circuitry, logically connected to said speculative processing unit and said first performance monitoring counter, wherein in response to said speculative operation being erroneous, said said first performance monitoring counter is overwritten with said first rewind register value from said rewind register.

2. The control circuit described in claim 1, wherein said speculative processing unit is a branch prediction unit.

3. The control circuit described in claim 1, wherein said performance monitoring unit includes a second performance monitoring counter, and wherein said second performance monitoring counter accumulates a count of processor cycles experienced by said microprocessor, and wherein said rewind register contains a second rewind register value that describes an accumulated number of processor cycles that are experienced by said microprocessor before executing said speculative operation, and wherein in response to said speculative operation being erroneous, said second performance monitoring counter is overwritten with second rewind register value from said rewind register.

4. The control circuit described in claim 1, wherein said performance monitoring unit includes a third performance monitoring counter, and wherein said third performance monitoring counter accumulates a count of instructions completed by said microprocessor, and wherein said rewind register contains a third rewind register value that describes an accumulated number of instructions that are completed by said microprocessor before executing said speculative operation, and wherein in response to said speculative operation being erroneous, said third performance monitoring counter is overwritten with said third rewind register value from said rewind register.

5. A method for use in a microprocessor having a speculative processing unit and a performance monitoring unit, said method comprising:

storing a first rewind register value in a rewind register, wherein said rewind register is logically connected to a first performance monitoring counter in a performance monitoring unit, and wherein said first performance monitoring counter accumulates a count of delay cycles experienced by a microprocessor during a load from a memory, and wherein said first rewind register value describes an accumulated number of delay cycles that are experienced by said microprocessor before executing a speculative operation; and in response to said speculative operation being erroneous, overwriting said first performance monitoring counter with said first rewind register value from said rewind register.

6. The method of claim 5, wherein said speculative processing unit is a branch prediction unit.

7. The method of claim 5, further comprising:

accumulating, in a second performance monitoring counter in said performance monitoring unit, a count of processor cycles experienced by said microprocessor;

storing a second rewind register value in said rewind register, wherein said second rewind register value describes an accumulated number of processor cycles that are experienced by said microprocessor before executing said speculative operation; and in response to said speculative operation being erroneous, overwriting said second performance monitoring counter with said second rewind register value from said rewind register.

8. The method of claim 5, further comprising:

accumulating, in a third performance monitoring counter in said performance monitoring unit, a count of instructions completed by said microprocessor;

storing a third rewind register value in said rewind register, wherein said third rewind register value describes an accumulated number of instructions that are completed by said microprocessor before executing said speculative operation; and in response to said speculative operation being erroneous, overwriting said third performance monitoring counter with said third rewind register value from said rewind register.

* * * * *